United States Patent
Eckel et al.

(10) Patent No.: US 8,485,703 B2
(45) Date of Patent: Jul. 16, 2013

(54) AIRCRAFT CABIN LIGHTING SYSTEM AND KIT THEREFOR

(75) Inventors: David P. Eckel, Fort Salonga, NY (US); Seckin Secilmis, Holbrook, NY (US)

(73) Assignee: B/E Aerospace, Inc., Wellington, FL (US)

( * ) Notice: Subject to any disclaimer, the term of this patent is extended or adjusted under 35 U.S.C. 154(b) by 1294 days.

(21) Appl. No.: 12/261,216

(22) Filed: Oct. 30, 2008

(65) Prior Publication Data

US 2010/0110706 A1    May 6, 2010

(51) Int. Cl.
*B64D 47/02* (2006.01)
*B60Q 1/00* (2006.01)
*B60Q 1/14* (2006.01)
*G08B 21/00* (2006.01)

(52) U.S. Cl.
USPC ........... 362/470; 362/471; 362/479; 362/478; 362/488; 340/945; 315/77

(58) Field of Classification Search
USPC ........................................ 362/479
See application file for complete search history.

(56) References Cited

U.S. PATENT DOCUMENTS

| | | | |
|---|---|---|---|
| 4,674,807 A * | 6/1987 | Boteler et al. | 439/106 |
| 5,644,304 A | 7/1997 | Pavarotti et al. | |
| 6,256,909 B1 * | 7/2001 | Kost et al. | 37/231 |
| 6,388,399 B1 * | 5/2002 | Eckel et al. | 315/312 |
| 6,901,439 B1 | 5/2005 | Bonasia et al. | |
| 7,026,768 B1 | 4/2006 | Ruiz | |
| 7,525,254 B2 | 4/2009 | Lys et al. | |
| 2002/0171379 A1 * | 11/2002 | Adamson | 315/312 |
| 2006/0266273 A1 * | 11/2006 | Westberg et al. | 116/62.1 |
| 2007/0273307 A1 * | 11/2007 | Westrick et al. | 315/312 |
| 2009/0021955 A1 * | 1/2009 | Kuang et al. | 362/479 |

* cited by examiner

*Primary Examiner* — Jennifer Mehmood
*Assistant Examiner* — Pameshanand Mahase
(74) *Attorney, Agent, or Firm* — Drinker Biddle & Reath LLP

(57) ABSTRACT

An aircraft cabin lighting kit includes: at least one lighting unit configured for installation in an aircraft cabin; a driving/dimming module generating output signals for controlling illumination of the at least one lighting unit according to command signals from a cabin management system; and at least one wire assembly interfacing the driving/dimming module with a power bus for receiving operational power, and a communication bus for receiving the command signals and for communicating the output signals to the at least one lighting unit. The present aircraft cabin lighting kit is certified by a governmental aviation-regulating body for installation in multiple aircraft. An aircraft cabin lighting system, which includes the kit, is also provided

13 Claims, 4 Drawing Sheets

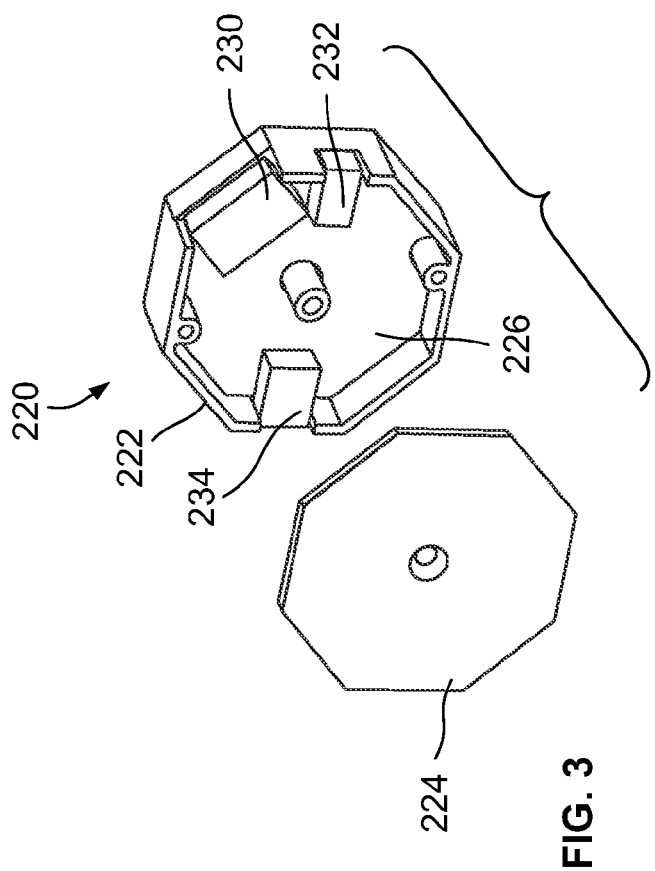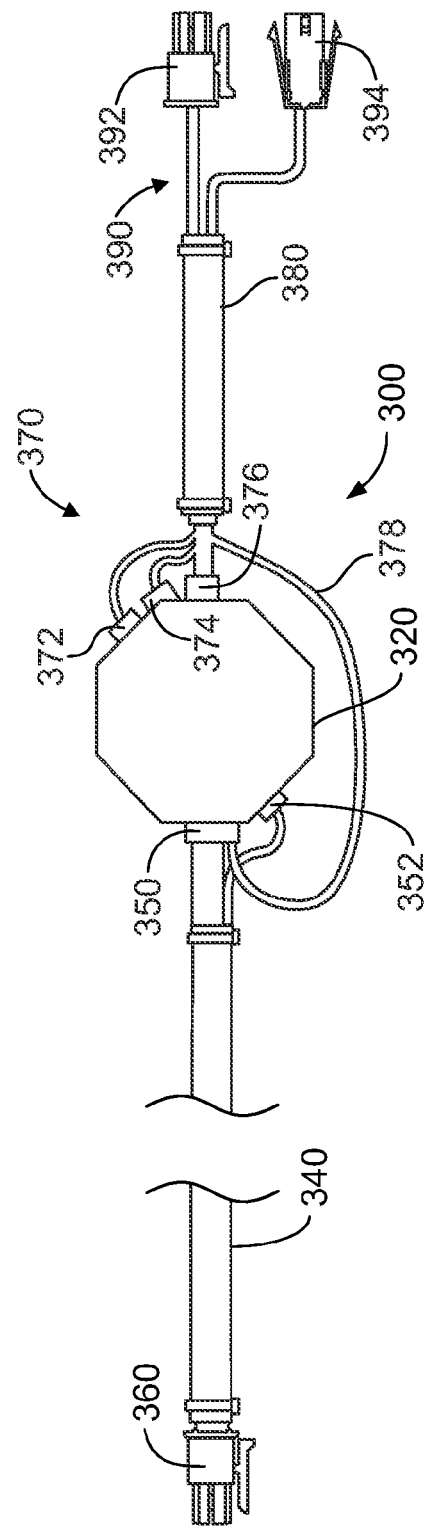
FIG. 3
FIG. 4

AIRCRAFT CABIN LIGHTING SYSTEM AND KIT THEREFOR

FIELD OF THE INVENTION

This invention pertains generally to aircraft interiors. More particularly, the present invention relates to an aircraft cabin lighting system and a kit for facilitating installation of the same.

BACKGROUND OF THE INVENTION

As known in the art, items (e.g., systems, sub-systems and components) that are installed on aircraft need to be reviewed and approved by a governmental aviation-regulating body to ensure that such items comply with applicable standards (e.g., airworthiness and other safety concerns). For example, in the United States the Federal Aviation Administration (FAA) requires any person or company producing replacement or modification parts for installation on a type-certificated product (i.e., aircraft) to obtain a parts manufacturer approval (PMA), which is a combined design and production approval for replacement parts. Also in some instances, a supplemental type certificate (STC) may additionally be needed to approve the design and installation of PMA parts on an aircraft when the PMA parts modify the type certificate (TC).

Since aircraft owners and operators are becoming more and more interested in refurbishing, upgrading or otherwise customizing the aircraft cabin interior with replacement and/or new items such as, for example, seating systems, in-flight entertainment (IFE) systems, and lighting systems, it can be appreciated that these replacement and/or new items need to be certified by PMA and/or STC before installation. Certification is made difficult because refurbishing, upgrading or otherwise customizing the aircraft cabin interior has, until now, entailed the use of custom-designed products. One custom-designed product is an aircraft-specific, light-controlling module with a unitary wiring harness that has a customized length or customized connectors terminating the wiring harness. Since the light-controlling module is custom-configured and certified for installation in the environment of one specific aircraft, when the module is adapted for another aircraft (e.g., by changing the wiring harness length or the terminating connector thereof) it can be appreciated that the adapted version of the certified module must be re-certified despite a minor structural change. Because the certification processes involved in obtaining a PMA and/or STC are time-consuming and complicated ordeals for parts manufacturers and/or installers, a pre-certified kit that facilitates installation of a customized aircraft cabin lighting system would be an important improvement in the art.

BRIEF SUMMARY OF THE INVENTION

In one aspect, an aircraft cabin lighting kit is provided. The present aircraft cabin lighting kits are certified by a governmental aviation-regulating body for installation in multiple aircraft.

The aircraft cabin lighting kit may comprise: at least one lighting unit configured for installation in an aircraft cabin; a driving/dimming module generating output signals for controlling illumination of the at least one lighting unit according to command signals from a cabin management system; and at least one wire assembly interfacing the driving/dimming module with a power bus for receiving operational power, and a communication bus for receiving the command signals and for communicating the output signals to the at least one lighting unit.

In another aspect, an aircraft cabin lighting system is provided. The aircraft cabin lighting system may comprise: a DC power bus; a communication bus; a cabin management system in communication with the communication bus, the cabin management system outputting command signals to the communication bus for controlling illumination of the aircraft cabin; and an aircraft cabin lighting kit. The aircraft cabin lighting kit may include a plurality of lighting units electrically connected to the DC power bus and the communication bus, a driving/dimming module electrically connected to the communication bus for generating light-controlling signals which dim and drive the plurality of lighting units according to the command signals from the cabin management system, and at least one wire assembly for interfacing the driving/dimming module with the power bus and the communication bus.

BRIEF DESCRIPTION OF THE DRAWINGS

FIG. 3 illustrates a dimmer/driver module of the kit of FIG. 2;

FIG. 4 illustrates another embodiment of an aircraft cabin lighting kit for the system of claim 1;

DETAILED DESCRIPTION

Figure 1:
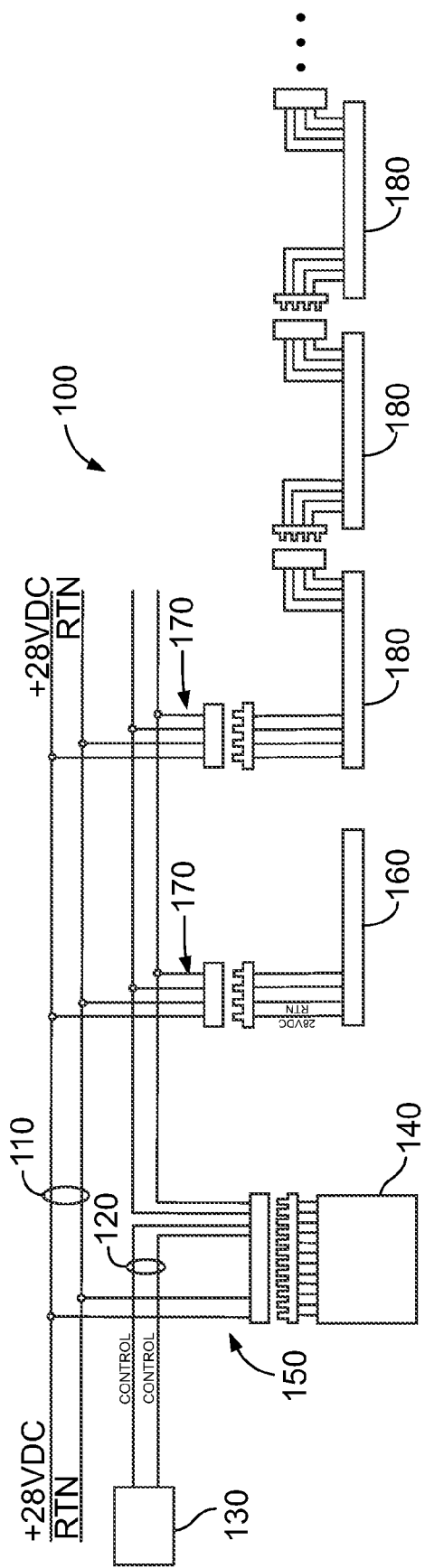
FIG. 1 illustrates a block diagram of an example aircraft cabin lighting system.

Turning now to the Figures, an aircraft cabin lighting system and kit are provided. FIG. 1 illustrates an example aircraft cabin lighting system. As shown in FIG. 1, the aircraft cabin lighting system 100 includes a power bus 110, a communication bus 120, a cabin management system 130, a dimmer/driver module 140, and a plurality of lighting units 160, 180. The cabin management system (CMS) 130 may be user interface such as a computer with a display and an input device (e.g., a keyboard and/or a mouse), a touch-screen, a flight attendant or crew panel with actuators (e.g., buttons, switches, etc.) and the like for operating/controlling lights, the crew intercom, and overhead announcement speakers as well as other cabin environmental and entertainment features. The CMS 130 is in communication with the aircraft communication bus 120 for outputting command signals to the communication bus 120 and for receiving signals (e.g., status signals and the like) via the communication bus 120 from downstream components such as, for example, the dimming/driving module 140 and the plurality of lighting units 160, 180 as shown. The communication bus 120 as shown is a two-wire bus, and the wires may be configured as a twisted pair (e.g., according to the RS485 or ARINC 429 specifications). Signals on the communication bus 120 may be of one or more protocols known in the art (e.g., CAN, ARINC 429, pulse width modulated (PWM) type signals, or the like). As further shown, the dimming/driving module 140 and the plurality of lighting units 160, 180 are in communication with the aircraft communication bus 120 as well as a power bus 110 for receiving operational power (e.g., 28 Volts DC as shown).

The dimming/driving module 140 includes a power and a communication interface for electrically connecting the module 140 with the busses 110, 120. As shown in FIG. 1, a wiring assembly or harness 150 is configured to engage with the power and communication busses 110, 120 as well as the power and the communication interfaces of the module 140 such that the module 140 is configured as a controlling node of the system 100. As can be appreciated, the lighting units 160, 180 of the plurality include a power interface and a communication interface. Another wiring assembly or harness indicated by reference number 170 is configured to engage with the power and communication busses 110, 120 as well as the power and the communication interfaces of the lighting units 160, 180 such that the lighting units 160, 180 are configured as controlled nodes of the system 100. As shown, the system 100 includes one or more lighting units 160 that are configured for direct connection with the busses 110, 120 via wiring harness 170. However, the system 100 may also include one or more lighting units 180 that are configured for direct and/or indirect connection with the busses 110, 120. That is, as shown the one or more lighting units 180 may be configured in a series connected, daisy chain configuration or the like such that one lighting unit 180 receives power and signals via another (preceding or upstream) lighting unit 180. Although not shown, it can be appreciated that the lighting units 160, 180 may include one or more white or colored light emitting diodes (LEDs). Furthermore, the lighting units 160, 180 may be configured as wash-type lights that provide ambient illumination within the passenger cabin, or as personal ambient lights (e.g., reading lights) that illuminate one passenger's seating area.

As can be appreciated, the dimming/driving module 140 is configured to receive command signals output from the CMS 130 (via the communication bus 120 and wiring harness 150), and output signals to the communication bus 120 for controlling illumination of the lighting units 160, 180 relative to the command signals. Signals output by the dimming/driving module 140 are communicated along the communication bus 120 to the lighting units 160, 180 for controlling illumination of the lighting units 160, 180. For example, the dimming/driving module 150 may be operable for turning the lighting units 160, 180 on and off, dimming, changing color and/or color temperature of the illumination, etc. The lighting units 160, 180 may be configured in a zone to provide illumination to a designated portion of the passenger cabin such as a first class, business class or economy class area of the cabin. Although not shown, additional dimming/driving modules may be provided such that each module 140 is configured to control illumination of a cabin class or portion of a cabin class. To this end, each module 140 may be configured with a communication address (e.g., a unique code) such that the CMS 130 can independently control illumination of various distinct areas in the cabin. The dimming/driving module 140 may be pre-set or programmed with a communication address, however as will be described hereinafter in further detail, the address may be changed, programmed or otherwise customized by the aircraft operator or installer of the system 100 before or after the module 140 is installed.

Figure 2:
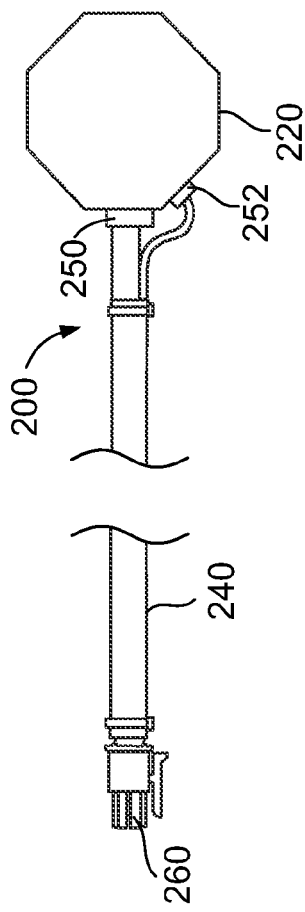
FIG. 2 illustrates one embodiment of an aircraft cabin lighting kit for the system of claim 1.

Turning now to FIG. 2, an example aircraft cabin lighting kit is described. As shown in FIG. 2, an embodiment of the example aircraft cabin lighting kit is indicated by reference number 200. The illustrated aircraft cabin lighting kit 200 includes a dimming/driving module 220 and a wiring apparatus or harness 240. The dimming/driving module 220 is generally octagonal in shape and includes power and communication interfaces on two adjacent sides (e.g., the left-most side and the side intermediate the lower side and the left-most side as shown in FIG. 2) of the module 220. The module 220 may be coupled, connected, mounted, attached or otherwise secured to a generally vertical or generally horizontal surface within the cabin interior (e.g., behind a wall or ceiling panel). Although the dimming/driving module 220 is generally octagonal, other embodiments of the module may be shaped otherwise, for example with various geometrically-shaped (e.g., polylinear or curvilinear) configurations. Furthermore, as can be appreciated, depending on the desired configuration of the system 100 and other factors (e.g., the layout of the cabin, distance between the module 220 and the busses 110, 120 and/or the lighting units 160, 180, etc.), the aircraft cabin lighting kit may be configured otherwise. For example, the aircraft cabin lighting kit may include one or more wiring harnesses of various lengths, one or more lighting units (e.g., if the aircraft cabin does not include pre-installed lighting units), etc.

As shown in FIG. 2, the wiring harness 240 includes a main wiring body (e.g., a bundle of wires or conductors) with a first end terminated by a first connector 260, which interfaces with the power and communication busses 110, 120 (FIG. 1). The illustrated wiring harness 240 further includes a second end defined by two connectors 250, 252 that terminate two wire assemblies that bifurcate from the main wiring body of the harness 240. One connector 252 of the second end of the wiring harness is configured to couple, connect or otherwise interface with the module 220 to provide operational power to the module 220, whereas the other connector 250 of the second end is configured to couple, connect or otherwise interface with the module 220 to communicate signals to and from the module 220. To this end, it can be appreciated that the power and communication interfaces and busses 110, 120 are isolated such that command signals or light-controlling output signals are not subject to crosstalk or other interference (e.g., due to momentary voltage spikes on the power bus 110).

Referring now to FIG. 3, the dimming/driving module 220 is further described. As shown in FIG. 3, the dimming/driving module 220 includes a housing defined by a first housing portion 222 and a second housing portion 224. The two housing portions 222, 224 may be secured together (e.g., by glueing, welding or other mechanical means such as a screw or other fastener known in the art) such that the portions 222, 224 enclose a circuit board 226 and partially enclose jacks, connectors or the like 230-234 (hereinafter connectors) that are configured to interface the module 220 with, for example, one or more components of the lighting system 100 (FIG. 1). In some embodiments of the dimming/driving module, the circuit board may be removable from the housing such that the circuit board may be replaced. Additionally, some embodiments of the dimming/driving module may include a second housing portion with knock-outs or the like and cover plates so that the module's housing can be configured to accept a circuit board with fewer or additional connectors. As will be described in further detail hereinafter with reference to FIG. 5, the circuit board 226 includes electrical and/or electronic components for communicating with the CMS 130, and for communicating with and controlling illumination of the lighting units 160, 180 via the communication bus 120. As shown, the module 220 includes first, second and third connectors 230, 232, 234 respectively. However, the module 220 may include fewer or additional connectors (e.g., see module 320 shown in FIG. 4 which includes five connectors). Connectors 230, 232, 234 may be surface-mounted to the circuit board 226 for interfacing the electrical and/or electronic elements on the board with one or more components (e.g., busses 110, 120, the CMS 130, and lighting units 160, 180 shown in FIG. 1) of the lighting system 100. As can be appreciated from comparing FIG. 3 with FIG. 2, the first connector 230 defines a communication interface of the module 220 whereas the second connector 232, which is adjacent to the connector 230, defines a power interface of the module 220. The third connector 234 may be configured to interface the module 220 with various products or system components. In one embodiment, the third connector 234 may be configured as an in-circuit serial programming (ICSP) interface for testing, programming, troubleshooting, etc. the dimming/driving module 200. In another embodiment, the third connector 234 may be configured to interface with an address module which will be described hereinafter. In yet another embodiment, the third connector 234 may be configured to interface the module 220 with components of the system such as another wiring harness (e.g., wiring assembly or harness 170 shown in FIG. 1) for connecting the module 220 directly or indirectly with one or more lighting units 160, 180.

Referring now to FIG. 4 another example aircraft cabin lighting kit is described. As shown in FIG. 4, an embodiment of the example aircraft cabin lighting kit is indicated by reference number 300. The illustrated aircraft cabin lighting kit 300 includes a dimming/driving module 320, a first wiring apparatus or harness 340, and a second wiring apparatus or harness 380. The module 320 may be coupled, connected, mounted, attached or otherwise secured to a generally vertical or generally horizontal surface within the cabin interior (e.g., behind a wall or ceiling panel). Although the dimming/driving module 320 is illustrated as being generally octagonal, other embodiments of the module may be shaped otherwise, for example with various geometrically-shaped (e.g., polylinear or curvilinear) configurations. Furthermore, although the wiring harnesses 340, 380 may be electrically isolated from each other, in some instances the first and second wiring harnesses 340, 380 may be electrically interconnected (e.g., by jumper 378 as shown which includes a wire or wires).

The dimming/driving module 320 includes power and communication interfaces on two adjacent sides (e.g., the left-most side and the side intermediate the lower side and the left-most side as shown in FIG. 4) of the module 320. As shown in FIG. 4, the wiring harness 340 includes a main wiring body (e.g., a bundle of wires or conductors) with a first end terminated by a first connector 360, which interfaces with the power and communication busses 110, 120 (FIG. 1). The illustrated wiring harness 340 further includes a second end defined by two connectors 350, 352 that terminate two wire assemblies that bifurcate from the main wiring body of the harness 340. As can be appreciated, the power and communication interfaces of the module 320 are configured to receive the connectors 350, 352.

One connector 352 of the second end of the wiring harness is configured to couple, connect or otherwise interface with the module 320 to provide operational power to the module 320, whereas the other connector 350 of the second end is configured to couple, connect or otherwise interface with the module 320 to communicate signals to and from the module 220. The module 320 further includes output interfaces. As shown in FIG. 4, the output interfaces of module 320 are configured on two adjacent sides (e.g., the right-most side and the side intermediate the upper side and the right-most side). The output interfaces are configured to receive connectors 372, 374, 376 of the second wiring harness 380, with the connectors 372, 374, 376 defining a first end 370 of the second wiring harness 380. A second end 390 of the second wiring harness 380 is defined by two wire assemblies that bifurcate from the main wiring body of the wiring harness 380 and which terminate in two connectors 392, 394. The connectors 392, 394 of the second end 390 of wiring harness 380 may be configured to engage with lighting units 160, 180 (FIG. 1) or other components of the system 100 that are downstream of the module 320.

In some instances, the jumper 378 may communicate output signals to the lighting units 160, 180 via the wiring harness 380 for controlling illumination of one or more of the lighting units 160, 180, thereby bypassing the communication bus 120. In an example, when the module 320 is operable to control illumination of lighting units using two or more communication protocols, a first subset, zone or grouping of lighting units may be controlled by the module 320 using a first communication protocol communicated via the bus 120 whereas a second subset, zone or grouping of lighting units may be controller by the module 320 using a second communication protocol communicated via the jumper 378 and second wiring harness 380. As can be appreciated, depending on the desired configuration of the system 100 and other factors (e.g., the layout of the cabin, distance between the module 320 and the busses 110, 120 and/or the lighting units 160, 180, etc.), the aircraft cabin lighting kit 300 may be configured otherwise. For example, the aircraft cabin lighting kit 300 may include fewer or additional wiring harnesses, wiring harnesses of various lengths, one or more lighting units (e.g., if the aircraft cabin does not include pre-installed lighting units), etc.

Figure 5:
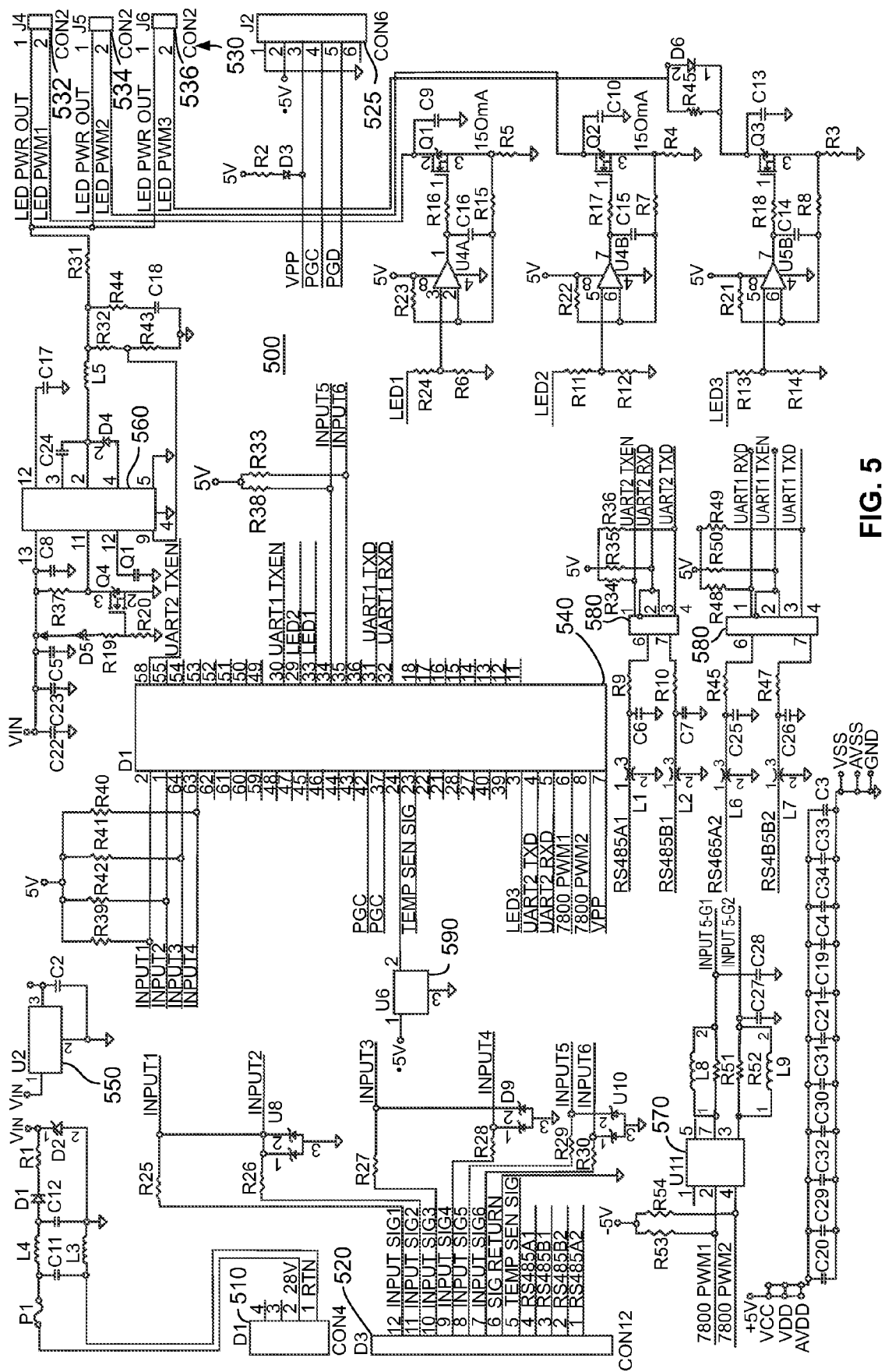
FIG. 5 illustrates an example schematic for the dimming/driving module of the kit shown in FIG. 4.

Turning now to FIG. 5 an example schematic of an embodiment of the dimming/driving module for an aircraft cabin lighting kit is described. As shown in FIG. 5, a dimming/driving module (e.g., modules 220, 320 of FIGS. 2 and 4 respectively) includes an electronic circuit 500 for communicating with the CMS 130 (FIG. 1) and for controlling illumination of one or more lighting units. The circuit 500 includes a power interface 510 for receiving operational power (e.g., 28 Volts DC as shown) from the power bus 110. Power interface 510 is electrically connected with a voltage regulator 550 to process the input voltage and provide a suitable voltage (e.g., 5 Volts DC as shown) to various components of the circuit 500. The circuit 500 further includes a communication interface 520 for receiving command signals or data from the CMS 130 (FIG. 1) via the communication bus 120, and for outputting control signals to the lighting units 160, 180 (FIG. 1) via the communication bus 120. Additionally, the dimming/driving module may receive status and other signals from downstream components (e.g., the lighting units 160, 180) via the communication interface 520 and communication bus 120. As shown, the signals received or output by the communication interface 520 may be of the RS485 standard or other protocol known in the art.

As further shown in FIG. 5, the dimming/driving module may include an output interface 530, which comprises three interfaces 532, 534, 536. These three interfaces 532-536 may correspond with the connectors 372-376 shown in FIG. 4 for outputting pulse width modulated (PWM) signals to one or more lighting units for controlling illumination intensity, color, color temperature or the like in a step-wise or continuous manner. Furthermore, the circuit 500 includes an in-circuit serial programming (ICSP) interface 525. As previously mentioned, the ICSP interface 525 may be used for testing, programming, troubleshooting, etc. the dimming/driving module. Additionally, the ICSP interface 525 may be used to change, program or otherwise customize a communication address of the dimming/driving module.

The circuit 500, as shown in FIG. 5, further includes a controller 540 (e.g., a microcontroller, microprocessor, DSP, etc.). The controller 540 stores and executes a set of instructions (e.g., software, firmware or the like) for processing inputs received via the communication interface 520 (e.g., command and status signals) and outputting data or signals (e.g., control signals) relative to the inputs. The circuit further includes a switching regulator 560, a MOSFET driver 570, communication transceivers 580 (universal asynchronous receiver/transmitter-UART), and a temperature sensor 590 for facilitating control of illumination of the lighting units 160, 180 of the system 100 (FIG. 1).

Figure 6:
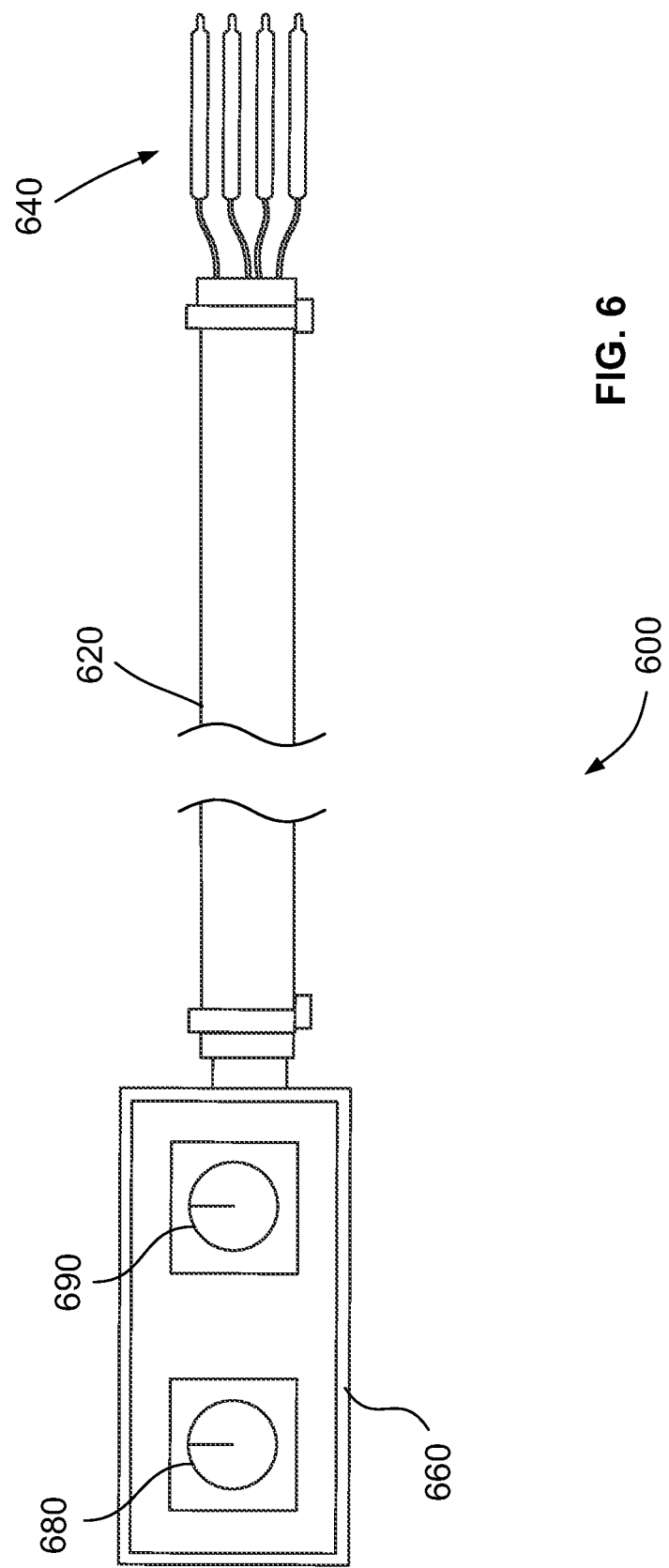
FIG. 6 illustrates an example addressing module for an aircraft cabin lighting kit and system.

Turning now to FIG. 6, an address module is described for embodiments of the lighting kit and system. As shown in FIG. 6, an example address module 600 includes a first portion 620, 640 for interfacing the address module 600 with a dimming/driving module, and a second portion 660 including a user interface defined by actuators 680, 690 (e.g., one or more switches such as DIP switches, rotatable knobs, or the like). The address module 600 may be communicatively coupled with the dimming/driving module, for example by inserting the connector 640 into an interface of the dimming/driving module (e.g., the ICSP interface 525 shown in FIG. 5). Additionally, the address module 600 may be communicatively coupled with one or more lighting units. The address module 600 may be used by an installer of the aircraft cabin lighting kit or system or by aircraft maintenance personnel so that the dimming/driving module and/or lighting units may be programmed with a communication address or so that a preset or pre-programmed address may be changed to a different address. The address module 600 may be employed as follows:

The maintenance person may set the address into the address module 600 by dialing in the address into two actuators 680, 690. Although not shown in FIG. 6, the second portion 660 may bear indicia around or otherwise proximate to the actuators 680, 690. The indicia on the second portion 660 may define a plurality of predetermined addresses relative to rotation of one or both of the actuators 680, 690. The dimming/driving module may be disconnected from the communication bus, and the address module is connected (e.g., to the ICSP interface or to the communication interface of the dimming/driving module). Next the dimming/driving module may be disconnected from and reconnected to the power bus to reset/power cycle the dimming/driving module. After being reset, the dimming/driving module recognizes the address module and the address module communicates an address to the dimming/driving module, the address being stored in a memory of the dimming/driving module such as a nonvolatile memory. Next, the address module may be disconnected from the dimming/driving module, and the dimming/driving module is reconnected to the communication bus.

In another embodiment, the address module may be a computing device (e.g., a laptop personal computer, a tablet computer, a personal digital assistant (PDA), a smartphone, etc.) By connecting the computing device to the dimming/driving module a user may program the dimming/driving module with a customized address by, for example typing the address into an address-setting application executing on the computing device.

Although the address module 600 may be provided with some aircraft lighting kits and systems, the address module 600 need not be provided or employed for changing, programming or otherwise assigning addresses. In yet another embodiment, the dimming/driving module may be programmed with an address by, for example, electrically connecting input pins of the communication interface (e.g., interface 520 of FIG. 5) to ground. In an example where the dimming/driving module includes four input pins, jumpering these four pins to ground will provide sixteen addresses. As shown in FIG. 5, the communication interface may include six input pins (INPUT SIG1-6) to provide additional addresses.

Still further, a token signal may be used to designate to the dimming/driving units and/or the lighting units that the following address information is intended for the device with the token signal high. After the device is programmed the next unit in the series, is addresses by activating its token line. This process may continue until some or all of the modules and/or lights are addressed.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Various embodiments of this invention are described herein. It should be understood that the illustrated and described embodiments are exemplary only, and should not be taken as limiting the scope of the invention.

What is claimed is:

1. An aircraft cabin lighting kit comprising:
   at least one lighting unit configured for installation in an aircraft cabin;
   a driving/dimming module that generates output signals for controlling illumination of the at least one lighting unit according to command signals from a cabin management system; and
   at least one wire assembly interfacing the driving/dimming module with a power bus for receiving operational power, and a communication bus for receiving the command signals and for communicating the output signals to the at least one lighting unit;
   wherein:
   the at least one wire assembly comprises:
      a first wiring harness configured to electrically interconnect the driving/dimming module with the power bus and the cabin management system, the first wiring harness comprising a bifurcation at an end of the first wiring harness that segregates the power interface and the communication interface, a first end and a second end of the bifurcation each entering a housing of the driving/dimming module at separated openings; and
      a second wiring harness configured to electrically interconnect the driving/dimming module with the at least one lighting unit;
   the driving/dimming module comprises:
      a power interface configured to engage with a connector of the at least one wire assembly for receiving operational power from the power bus; and
      a communication interface configured to engage with another connector of the at least one wire assembly for receiving the command signals and transmitting the output signals; and the power interface and the communication interface are physically and electrically isolated from each other to eliminate cross talk.

2. An aircraft cabin lighting kit comprising:
at least one lighting unit configured for installation in an aircraft cabin;
a driving/dimming module generating output signals for controlling illumination of the at least one lighting unit according to command signals from a cabin management system; and
at least one wire assembly interfacing the driving/dimming module with a power bus for receiving operational power, and a communication bus for receiving the command signals and for communicating the output signals to the at least one lighting unit;
an address module operable for at least one of assigning a communication address to the driving/dimming module, and changing a pre-set communication address of the driving/dimming module to a different communication address;
wherein the address module includes a physical actuator as a user interface for selecting a desired communication address from a plurality of predetermined communication addresses.

3. The kit of claim 2 wherein the user interface comprises a pair of rotatable knobs.

4. The kit of claim 1 wherein each of the at least one lighting unit, the dimming/driving module, and the at least one wiring assembly is certified by a governmental aviation-regulating body for installation in multiple aircraft.

5. An aircraft cabin lighting system comprising:
a DC power bus;
a communication bus;
a cabin management system in communication with the communication bus, the cabin management system outputting command signals to the communication bus for controlling illumination of the aircraft cabin; and
an aircraft cabin lighting kit comprising:
a plurality of lighting units electrically connected to the DC power bus and the communication bus,
a driving/dimming module electrically connected to the communication bus for generating light-controlling signals which dim and drive the plurality of lighting units according to the command signals from the cabin management system, and
at least one wire assembly for interfacing the driving/dimming module with the power bus and the communication bus;
wherein:
the at least one wire assembly comprises:
a first wiring harness configured to electrically interconnect the driving/dimming module with the power bus and the cabin management system, the first wiring harness comprising a bifurcation at an end of the first wiring harness that segregates the power interface and the communication interface, a first end and a second end of the bifurcation each entering a housing of the driving/dimming module at separated openings; and
a second wiring harness configured to electrically interconnect the driving/dimming module with the at least one lighting unit;
the driving/dimming module comprises:
a power interface configured to engage with a connector of the at least one wire assembly for receiving operational power from the power bus; and
a communication interface configured to engage with another connector of the at least one wire assembly for receiving the command signals and transmitting the output signals; and
the power interface and the communication interface are physically and electrically isolated from each other to eliminate cross talk.

6. The system of claim 5 wherein the aircraft cabin lighting kit further comprises an address module operable for at least one of assigning a communication address to the driving/dimming module, and changing a pre-set communication address of the driving/dimming module to a different communication address.

7. The system of claim 6 wherein the address module includes a user interface for selecting a desired communication address from a plurality of predetermined communication addresses.

8. The system of claim 7 wherein the user interface comprises a pair of rotatable knobs.

9. The system of claim 6 wherein the address module is a computing device for programming the dimming/driving module with a customized communication address.

10. The system of claim 5 wherein the aircraft cabin lighting kit is certified by a governmental aviation-regulating body for installation in multiple aircraft.

11. The kit of claim 1, wherein:
the second wiring harness comprises a first end that interfaces to the driving/dimming module, and a second end that interfaces with the at least one lighting unit; and
the second end of the second wiring harness is bifurcated, with each bifurcation end comprising a second connector.

12. The kit of claim 11, wherein the first end of the second wiring harness is trifurcated, with each trifurcation end entering the housing of the driving/dimming module at separated openings.

13. The kit of claim 1, further comprising a bypass jumper that bypasses the communication interface of the driving/dimming module.

\* \* \* \* \*